(12) United States Patent
Odate

(10) Patent No.: US 12,428,056 B2
(45) Date of Patent: Sep. 30, 2025

(54) DRIVING CONTROL DEVICE

(71) Applicant: HONDA MOTOR CO., LTD., Tokyo (JP)

(72) Inventor: Shotaro Odate, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 18/582,869

(22) Filed: Feb. 21, 2024

(65) Prior Publication Data

US 2024/0286676 A1 Aug. 29, 2024

(30) Foreign Application Priority Data

Feb. 27, 2023 (JP) ................. 2023-028720

(51) Int. Cl.
*B62D 6/10* (2006.01)
*B62D 1/08* (2006.01)
*B62D 1/10* (2006.01)
*B62D 15/02* (2006.01)

(52) U.S. Cl.
CPC ............. *B62D 6/10* (2013.01); *B62D 1/08* (2013.01); *B62D 1/10* (2013.01); *B62D 15/025* (2013.01)

(58) Field of Classification Search
CPC ... B62D 1/08; B62D 1/10; B62D 6/08; B62D 6/10; B62D 15/025
See application file for complete search history.

(56) References Cited

U.S. PATENT DOCUMENTS 8,886,411 B2 11/2014 Hisazumi et al.

FOREIGN PATENT DOCUMENTS

| DE | 20309603 U1 * | 9/2003 | ............. B62D 1/046 |
| JP | 2014054927 A | 3/2014 | |

OTHER PUBLICATIONS

Takata, P, De 20309603, machine translation. (Year: 2003).*

* cited by examiner

*Primary Examiner* — Phutthiwat Wongwian
*Assistant Examiner* — Mark L. Greene
(74) *Attorney, Agent, or Firm* — Armstrong Teasdale LLP

(57) ABSTRACT

A driving control device includes a steering wheel configured to receive a steering operation, an approach sensor provided in the steering wheel and configured such that a detection value changes as a driver's hand approaches the steering wheel, a steering device configured to turn wheels according to the steering operation, and a controller configured to control the steering device. The controller is configured to estimate a change in a position of the driver's hand based on a change in the detection value of the approach sensor, estimate a moving mode of the driver's hand based on the estimated change in the position of the driver's hand, and cause the steering device to turn the wheels in a case where a vehicle speed is equal to or lower than a threshold value and the moving mode of the driver's hand is a mode along a circumferential direction.

8 Claims, 3 Drawing Sheets

DRIVING CONTROL DEVICE

TECHNICAL FIELD

The present invention relates to a driving control device.

BACKGROUND ART

In recent years, there has been an increase in efforts to give consideration to vulnerable people among transport participants and provide them with access to sustainable transport systems. To this end, research and development to further improve traffic safety and convenience through the development of driving assistance technologies is attracting attention. In particular, the development of a driving control device is attracting attention as a development relating to the driving assistance technologies.

For example, a known driving control device includes a steering wheel configured to receive a steering operation of a vehicle by a driver, a steering device configured to steer wheels according to the steering operation of the vehicle by the driver, and a controller configured to control the steering device.

In such a driving control device, a large force is required for the steering operation at low vehicle speeds. In particular, the steering operation (so-called "static steering operation") when the vehicle is stopped requires a large amount of force. Accordingly, a general driving control device is provided with a power steering device for assisting the steering operation at low vehicle speeds (see JP2014-54927A).

However, even if the power steering device assists the steering operation at low vehicle speeds, a certain amount of force is still required for the steering operation at low vehicle speeds. Accordingly, the steering operation at low vehicle speeds remains a burden for relatively weak drivers (for example, elderly drivers), and there is still room for improvement so as to improve the marketability of vehicles.

SUMMARY OF THE INVENTION

In view of the above background, an object of the present invention is to reduce the burden of the steering operation at low vehicle speeds, and to contribute to the development of a sustainable transportation system accordingly.

To achieve such an object, one aspect of the present invention provides a driving control device (3), comprising: a steering wheel (22) configured to receive a steering operation of a vehicle (1) by a driver; an approach sensor (35) provided in the steering wheel and configured such that a detection value of the approach sensor changes as a driver's hand approaches the steering wheel; a steering device (7) configured to turn wheels (17) according to the steering operation of the vehicle by the driver; and a controller (15) configured to control the steering device, wherein the controller is configured to estimate a change in a position of the driver's hand that has approached the steering wheel based on a change in the detection value of the approach sensor, estimate a moving mode of the driver's hand that has approached the steering wheel based on the estimated change in the position of the driver's hand, and cause the steering device to turn the wheels in a case where a vehicle speed of the vehicle is equal to or lower than a prescribed threshold value and the estimated moving mode of the driver's hand is a mode along a circumferential direction of the steering wheel.

According to this aspect, when the vehicle speed is low (for example, when the vehicle is stopped), the driver can turn the vehicle by moving his/her hand along the circumferential direction of the steering wheel without grasping and rotating the steering wheel. In other words, when the vehicle speed is low, the driver can turn the vehicle by making a gesture along the circumferential direction of the steering wheel without having to directly perform the steering operation (for example, "static steering operation") on the steering wheel. Accordingly, a complicated steering operation including an operation to change the grip of the steering wheel is not necessary, so that the burden of the steering operation at low vehicle speeds can be reduced. Accordingly, it is possible to contribute to the development of a sustainable transportation system.

In the above aspect, preferably, the approach sensor includes a plurality of capacitive sensors (53, 54, 56, and 57) configured such that capacitance thereof changes as the driver's hand approaches the steering wheel, and the controller is configured to estimate a time series change in the position of the driver's hand that has approached the steering wheel based on a change in the capacitance of the plurality of capacitive sensors, and estimate a moving direction and moving speed of the driver's hand based on the estimated time series change in the position of the driver's hand.

According to this aspect, by monitoring the time series change in the position of the driver's hand, the moving direction and moving speed of the driver's hand can be accurately estimated.

In the above aspect, preferably, the controller is configured to determine a turning direction and turning speed of the wheels based on the estimated moving direction and moving speed of the driver's hand.

According to this aspect, based on the direction and speed of the driver's gesture, the turning direction and turning speed of the wheels can be determined. Accordingly, the driver's intention can be reflected in the automatic turning of the wheels by the steering device, so that the driver's discomfort can be reduced.

In the above aspect, preferably, the steering wheel includes an annular rim (44), and the approach sensor includes a capacitive sensor (53, 54, 56, and 57) configured such that capacitance thereof starts to change as the driver's hand approaches the rim in a state where the driver's hand is not in contact with the rim.

According to this aspect, even when the driver's hand is not in contact with the rim, the driver's gesture can be recognized based on the capacitance of the capacitive sensor. Accordingly, the driver can turn the vehicle without contacting with the rim. Accordingly, as compared with a case where the driver's gesture is recognized using a sensor (for example, a contact-type pressure sensor) that requires the driver's hand to contact with the rim, the frequency at which the driver's hand contacts with the rim can be reduced. Accordingly, the effect of suppressing aging of the outer surface of the rim is expected to be caused.

In the above aspect, preferably, the controller is configured to cause the steering device to turn the wheels in a case where the vehicle speed of the vehicle is equal to or lower than the threshold value and the estimated moving mode of the driver's hand is a mode along a circumferential direction of the rim.

According to this aspect, even if the turning state of the wheels suddenly changes while the driver is making a gesture along the circumferential direction of the rim, the driver can immediately grasp the rim and make a direct steering operation on the steering wheel. Accordingly, the safety of the vehicle can be improved.

In the above aspect, preferably, the steering wheel includes: a hub (43) provided on a rotation axis (A) of the steering wheel; an annular rim (44) provided outside the hub with respect to a radial direction of the steering wheel; and a plurality of spokes (45 to 47) extending in the radial direction of the steering wheel to connect the hub and the rim, and the approach sensor is composed of a plurality of capacitive sensors (53, 54, 56, and 57) arranged in the hub and/or the plurality of spokes.

According to this aspect, electrodes constituting the capacitive sensors are arranged in the hub and/or the plurality of spokes. Thus, the arrangement cost of the capacitive sensors can be reduced as compared with a case where the electrodes constituting the capacitive sensors are insert-molded inside the annular rim. Accordingly, the manufacturing cost of the steering wheel as a whole can be reduced.

In the above aspect, preferably, the plurality of spokes includes: a right spoke (45) extending rightward from the hub; and a left spoke (46) extending leftward from the hub, the plurality of capacitive sensors includes: a first right capacitive sensor (53) arranged in the right spoke; a second right capacitive sensor (54) arranged below the first right capacitive sensor and extending in the right spoke and the hub; a first left capacitive sensor (56) arranged in the left spoke; and a second left capacitive sensor (57) arranged below the first left capacitive sensor and extending in the left spoke and the hub.

According to this aspect, the detection range of the plurality of capacitive sensors can be expanded as compared with a case where the plurality of capacitive sensors are arranged only in the plurality of spokes or a case where the plurality of capacitive sensors are arranged only in the hub. Accordingly, the moving mode of the driver's hand can be accurately estimated without arranging the plurality of capacitive sensors in the rim.

In the above aspect, preferably, the approach sensor includes: a right sensor (53 and 54) arranged in a right portion of the steering wheel; and a left sensor (56 and 57) arranged in a left portion of the steering wheel, and the controller is configured to invalidate an estimation result of the moving mode of the driver's hand in a case where a detection value of the right sensor and a detection value of the left sensor change alternately.

According to this aspect, it is possible to prevent a situation where the moving mode of the driver's hand is incorrectly estimated to be the mode along the circumferential direction of the steering wheel even though the driver does not make a gesture along the circumferential direction of the rim.

Thus, according to the above aspects, it is possible to reduce the burden of the steering operation at low vehicle speeds.

BRIEF DESCRIPTION OF THE DRAWING(S)

DETAILED DESCRIPTION OF THE INVENTION

<The Vehicle 1>

Figure 1:
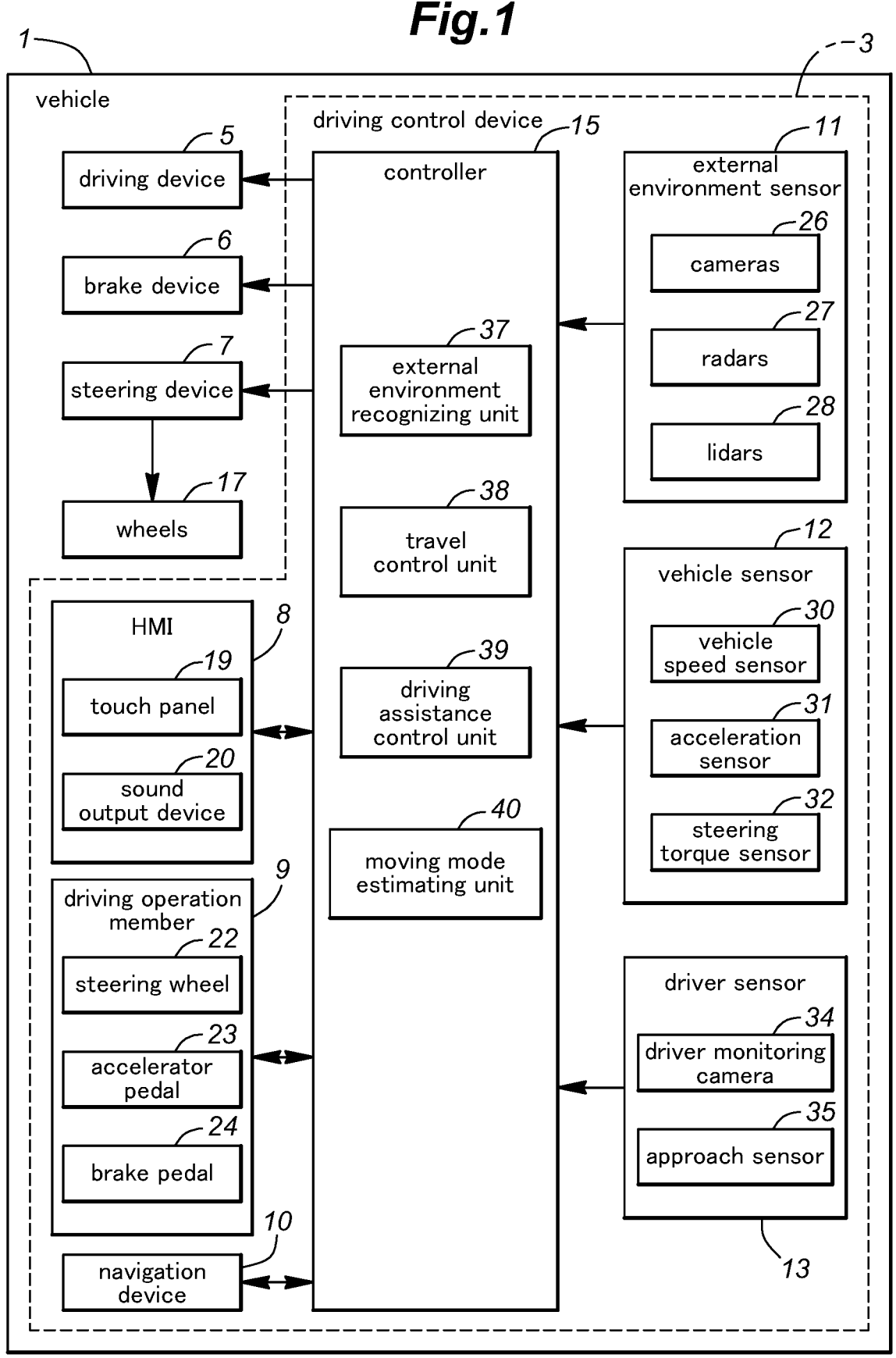
FIG. 1 is a functional block diagram showing a vehicle to which a driving control device according to an embodiment of the present invention is applied.

First, with reference to FIG. 1, a vehicle 1 to which a driving control device 3 according to an embodiment of the present invention is applied will be described. For example, the vehicle 1 is an automobile. In another embodiment, the vehicle 1 may be a vehicle (for example, a motorcycle) other than an automobile.

The vehicle 1 includes a driving device 5, a brake device 6, a steering device 7, a Human Machine Interface 8 (HMI), a driving operation member 9, a navigation device 10, an external environment sensor 11, a vehicle sensor 12, a driver sensor 13, and a controller 15. Hereinafter, the components of the vehicle 1 will be described in order.

The driving device 5 is a device that applies a driving force to the vehicle 1. The driving device 5 includes a drive source that generates a driving force for driving the vehicle 1. For example, the drive source is configured by an internal combustion engine and/or an electric motor.

The brake device 6 is a device that applies a braking force to the vehicle 1. For example, the brake device 6 includes a brake caliper that presses a pad against a brake rotor, and an electric cylinder that supplies hydraulic pressure to the brake caliper.

The steering device 7 is a device that changes a turning angle of wheels 17 by turning the wheels 17 according to a steering operation of the vehicle 1 by a driver. For example, the steering device 7 includes a rack and pinion mechanism connected to the wheels 17 and an electric motor that drives the rack and pinion mechanism.

The HMI 8 is a device that presents information to an occupant (for example, the driver) of the vehicle 1 and receives information input by the occupant. The HMI 8 includes a touch panel 19 and a sound output device 20. The touch panel 19 displays various screens to the occupant and receives input operations on the various screens by the occupant. The sound output device 20 outputs audio guidance, warning sounds, or the like.

The driving operation member 9 is a device that receives a driving operation by the driver. The driving operation member 9 includes a steering wheel 22 that receives the steering operation of the vehicle 1 by the driver, an accelerator pedal 23 that receives an acceleration operation of the vehicle 1 by the driver, and a brake pedal 24 that receives a brake operation of the vehicle 1 by the driver. Details of the steering wheel 22 will be described later.

The navigation device 10 is a device that provides route guidance to the destination of the vehicle 1. The navigation device 10 identifies the current position of the vehicle 1 based on GNSS signals received from artificial satellites. The navigation device 10 sets a route to the destination of the vehicle 1 based on the current position of the vehicle 1 and the destination of the vehicle 1 input into the touch panel 19 by the occupant.

The external environment sensor 11 is a device that detects the state of the external environment of the vehicle 1. The external environment sensor 11 includes a plurality of cameras 26, a plurality of radars 27, and a plurality of lidars 28 (LiDAR). Each camera 26 captures an image of a target (surrounding vehicles such as a preceding vehicle, pedestrians, structures on a road, lane markings, or the like) existing around the vehicle 1. Each radar 27 detects the position of the target existing around the vehicle 1 by emitting radio waves such as millimeter waves around the vehicle 1 and capturing the reflected waves thereof. Each lidar 28 detects the position of the target existing around the vehicle 1 by irradiating light such as infrared rays around the vehicle 1 and capturing the reflected light thereof.

The vehicle sensor 12 is a sensor that detects various vehicle states. The vehicle sensor 12 includes a vehicle speed sensor 30 that detects the vehicle speed of the vehicle 1, an acceleration sensor 31 that detects the acceleration (lateral acceleration) of the vehicle 1 in the lateral direction, and a steering torque sensor 32 that detects the steering torque generated in response to the steering operation of the vehicle 1 by the driver.

The driver sensor 13 is a device that detects the state of the driver. The driver sensor 13 includes a driver monitoring camera 34 and an approach sensor 35. The driver monitoring camera 34 captures an image of the driver. The approach sensor 35 is provided in the steering wheel 22, and configured such that the capacitance (detection value) of the approach sensor 35 changes as a driver's hand approaches the steering wheel 22. Details of the approach sensor 35 will be described later.

The controller 15 constitutes the driving control device 3 together with the HMI 8, the driving operation member 9, the navigation device 10, the external environment sensor 11, the vehicle sensor 12, and the driver sensor 13.

The controller 15 is an electronic control unit (ECU) consisting of a computer configured to perform various processes. The controller 15 includes an arithmetic processing unit (a processor such as CPU and MPU) and a storage device (memory such as ROM and RAM). The arithmetic processing unit reads necessary software from the storage device and executes prescribed arithmetic processing according to the read software. The controller 15 may be configured as one piece of hardware, or may be configured as a unit consisting of plural pieces of hardware. The controller 15 is connected to each component of the vehicle 1 via a communication network such as Controller Area Network (CAN), and controls each component of the vehicle 1.

The controller 15 includes, as functional components, an external environment recognizing unit 37, a travel control unit 38, a driving assistance control unit 39, and a moving mode estimating unit 40. At least some of the functional components of the controller 15 may be realized by hardware such as LSI, ASIC, and FPGA, or may be realized by a combination of software and hardware.

The external environment recognizing unit 37 recognizes the state of the external environment of the vehicle 1 based on the detection result of the external environment sensor 11. For example, the external environment recognizing unit 37 recognizes the target (surrounding vehicles such as a preceding vehicle, pedestrians, structures on a road, lane markings, or the like) existing around the vehicle 1 based on the detection result of the external environment sensor 11.

The travel control unit 38 controls the traveling of the vehicle 1 according to the driving operation on the driving operation member 9 by the driver. For example, the travel control unit 38 controls the steering device 7 to turn the vehicle 1 in response to the steering operation of the vehicle 1 on the steering wheel 22 by the driver. The travel control unit 38 controls the driving device 5 according to the acceleration operation of the vehicle 1 on the accelerator pedal 23 by the driver, and accelerates the vehicle 1. The travel control unit 38 controls the brake device 6 in response to the brake operation of the vehicle 1 on the brake pedal 24 by the driver, and decelerates the vehicle 1.

The driving assistance control unit 39 executes advanced driving assistance control (Advanced Driver Assistance Systems: ADAS) of the vehicle 1 based on the recognition result of the external environment recognizing unit 37. Hereinafter, the advanced driving assistance control will be abbreviated as "driving assistance control".

The driving assistance control unit 39 is configured to execute following travel control (adaptive cruise control: ACC) as the driving assistance control. When executing ACC, the driving assistance control unit 39 controls the driving device 5 and the brake device 6 to cause the vehicle 1 to follow the preceding vehicle while maintaining a prescribed inter-vehicle distance.

The driving assistance control unit 39 is configured to execute lane keeping assistance control (Lane Keeping Assistance System: LKAS) as the driving assistance control. When executing LKAS, the driving assistance control unit 39 controls the steering wheel 22 and the steering device 7 to assist the steering operation of the vehicle 1 by the driver such that the vehicle 1 maintains the traveling position within a lane.

The driving assistance control unit 39 is configured to execute collision mitigation brake control (Collision Mitigation Brake System: CMBS) as the driving assistance control. When executing CMBS, the driving assistance control unit 39 controls the brake device 6 to mitigate the collision between the vehicle 1 and an object outside the vehicle.

The moving mode estimating unit 40 estimates the position of the driver's hand approaching the steering wheel 22 based on the capacitance of the approach sensor 35. The moving mode estimating unit 40 estimates the moving mode, moving direction, and moving speed of the driver's hand based on the estimated position of the driver's hand. Details of the method for estimating the moving mode, moving direction, and moving speed of the driver's hand will be described later.

In the following, for convenience of explanation, the functional components of the controller 15 will be simply referred to as "the controller 15" without distinction.

<The Configuration of the Steering Wheel 22>

Next, the configuration of the steering wheel 22 will be described with reference to FIG. 2. Hereinafter, the simple phrase "the radial direction" refers to the radial direction of the steering wheel 22, and the simple phrase "the circumferential direction" refers to the circumferential direction of the steering wheel 22.

The steering wheel 22 includes a cylindrical hub 43 provided on a rotation axis A of the steering wheel 22, an annular rim 44 provided outside the hub 43 with respect to the radial direction, and a plurality of spokes 45 to 47 extending in the radial direction and connecting the hub 43 and the rim 44.

The hub 43 is rotatably connected to a steering shaft (not shown) connected to the steering device 7. Thus, the steering wheel 22 is rotatably supported by the steering shaft.

The rim 44 is spaced away from the hub 43 with respect to the radial direction. In another embodiment, the plurality of spokes 45 to 47 may be omitted, and the rim 44 may be directly connected to the hub 43.

The plurality of spokes 45 to 47 is spaced away from each other with respect to the circumferential direction. The plurality of spokes 45 to 47 includes a right spoke 45 extending rightward from the hub 43, a left spoke 46 extending leftward from the hub 43, and a lower spoke 47 extending downward from the hub 43. A rectangular right switch unit 49 is provided on a rear surface (a surface on the driver's side) of the right spoke 45. For example, the right switch unit 49 includes a switch for starting/ending the driving assistance control, a switch for changing the state of the driving assistance control (for example, a set vehicle speed in ACC), and the like. A rectangular left switch unit 50 is provided on a rear surface (a surface on the driver's side) of the left spoke 46. For example, the left switch unit 50 includes a switch for operating an air conditioner (not shown), a switch for operating the navigation device 10, and the like.

<The Configuration and Action of the Approach Sensor 35>

Next, the configuration and action of the approach sensor 35 will be described with reference to FIG. 2.

The approach sensor 35 includes a first right capacitive sensor 53, a second right capacitive sensor 54, a first left capacitive sensor 56, and a second left capacitive sensor 57. The first and second right capacitive sensors 53 and 54 are examples of right sensors arranged in a right portion of the steering wheel 22. The first and second left capacitive sensors 56 and 57 are examples of left sensors arranged in a left portion of the steering wheel 22. Hereinafter, when the first right capacitive sensor 53, the second right capacitive sensor 54, the first left capacitive sensor 56, and the second left capacitive sensor 57 are not distinguished, they will be referred to as "capacitive sensor(s) 53, 54, 56, and 57".

Each capacitive sensor 53, 54, 56, and 57 is formed of an electrode that can be capacitively coupled to an object approaching the steering wheel 22. As the driver's hand approaches the steering wheel 22, the distance between the driver's hand and the electrode forming the capacitive sensor 53, 54, 56, and 57 becomes shorter, and thus the capacitance (an example of a detection value) of the capacitive sensor 53, 54, 56, and 57 increases. The capacitive sensor 53, 54, 56, and 57 is configured such that the capacitance of the capacitive sensor 53, 54, 56, and 57 starts to change as the driver's hand approaches the rim 44 of the steering wheel 22 in a state where the driver's hand is not in contact with the rim 44. In other words, the capacitive sensor 53, 54, 56, and 57 has sensitivity to detect the position of the driver's hand in a state where the driver's hand is separated from the rim 44.

The first right capacitive sensor 53 is arranged in the right spoke 45. The first right capacitive sensor 53 includes a first extending portion 61 extending in the lateral direction along an upper edge of the right switch unit 49, a second extending portion 62 bent upward from a left end (an inner end in the radial direction) of the first extending portion 61 and extending along an upper outer circumference of the hub 43, and a third extending portion 63 bent downward from a right end (an outer end in the radial direction) of the first extending portion 61 and extending along a right edge (outer edge) of the right switch unit 49.

The second right capacitive sensor 54 is arranged below the first right capacitive sensor 53 and extending in the right spoke 45 and the hub 43. The second right capacitive sensor 54 includes an upper extending portion 65 extending in the lateral direction along a lower edge of the right switch unit 49, and a lower extending portion 66 bent downward from a left end (an inner end in the radial direction) of the upper extending portion 65 and extending along a lower outer circumference of the hub 43.

The first left capacitive sensor 56 is arranged in the left spoke 46. The first left capacitive sensor 56, like the first right capacitive sensor 53, includes the first extending portion 61, the second extending portion 62, and the third extending portion 63.

The second left capacitive sensor 57 is arranged below the first left capacitive sensor 56 and extending in the left spoke 46 and the hub 43. The second left capacitive sensor 57, like the second right capacitive sensor 54, includes an upper extending portion 65 and a lower extending portion 66.

When the driver's hand (for example, a right hand) approaches a right upper portion 44R1 of the rim 44, the capacitance of the first right capacitive sensor 53 increases to a prescribed reference value or more. In this case, the controller 15 estimates that the driver's hand is approaching the right upper portion 44R1 of the rim 44. In other words, the approach sensor 35 detects that the driver's hand is approaching the right upper portion 44R1 of the rim 44.

When the driver's hand approaches a right intermediate portion 44R2 of the rim 44, the capacitance of the first right capacitive sensor 53 and the second right capacitive sensor 54 increases to the reference value or more. In this case, the controller 15 estimates that the driver's hand is approaching the right intermediate portion 44R2 of the rim 44. In other words, the approach sensor 35 detects that the driver's hand is approaching the right intermediate portion 44R2 of the rim 44.

When the driver's hand approaches a right lower portion 44R3 of the rim 44, the capacitance of the second right capacitive sensor 54 increases to the reference value or more. In this case, the controller 15 estimates that the driver's hand is approaching the right lower portion 44R3 of the rim 44. In other words, the approach sensor 35 detects that the driver's hand is approaching the right lower portion 44R3 of the rim 44.

When the driver's hand (for example, a left hand) approaches a left upper portion 44L1, a left intermediate portion 44L2, and a left lower portion 44L3 of the rim 44, the controller 15 estimates, according to the same effect as described above, that the driver's hand is approaching the left upper portion 44L1, the left intermediate portion 44L2, and the left lower portion 44L3 of the rim 44. In other words, the approach sensor 35 detects that the driver's hand is approaching the left upper portion 44L1, the left intermediate portion 44L2, and the left lower portion 44L3 of the rim 44.

<The Estimation of the Moving Mode, Moving Direction, and Moving Speed of the Driver's Hand>

Next, with reference to FIG. 2, a method for the controller 15 to estimate the moving mode, moving direction, and moving speed of the driver's hand will be described. The estimation method at the time when the driver's hand approaches or contacts with the left portion 44L (the left upper portion 44L1, the left intermediate portion 44L2, and the left lower portion 44L3) of the rim 44 is the same as the estimation method at the time when the driver's hand approaches or contacts with the right portion 44R (the right upper portion 44R1, the right intermediate portion 44R2, and the right lower portion 44R3) of the rim 44. Accordingly, only the estimation method at the time when the driver's hand approaches or contacts with the left portion 44L of the rim 44 will be described below. Hereinafter, "clockwise direction" or "counterclockwise direction" refers to "clockwise direction" or "counterclockwise direction" as viewed from the rear to the front of the vehicle 1.

Figure 2:
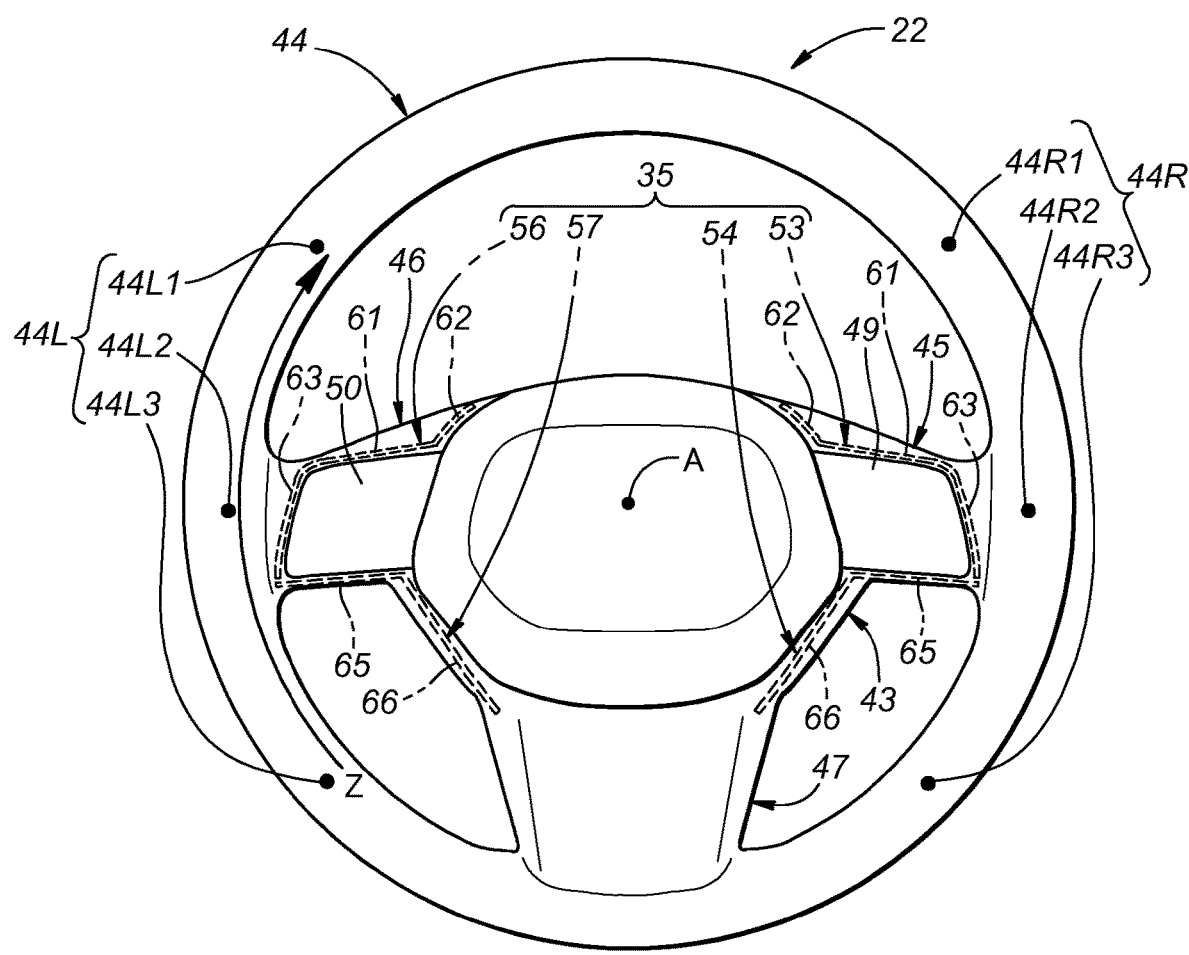
FIG. 2 is a front view showing a steering wheel according to the embodiment of the present invention.

As shown by an arrow Z in FIG. 2, when the driver makes a gesture in the clockwise direction along the circumferential direction of the left portion 44L of the rim 44 in a state where the driver's hand is approaching or contacting with the left portion 44L of the rim 44, the capacitance of the first and second left capacitive sensors 56 and 57 change.

For example, when the driver's hand approaches the left lower portion 44L3 of the rim 44 at time T1, the capacitance of the second left capacitive sensor 57 increases to the reference value or more while the capacitance of the first left capacitive sensor 56 remains at a value below the reference value.

Next, when the driver's hand moves upward from the left lower portion 44L3 of the rim 44 and approaches the left intermediate portion 44L2 of the rim 44 at time T2, the capacitance of the first left capacitive sensor 56 increases to the reference value or more while the capacitance of the second left capacitive sensor 57 remains at the reference value or more.

Next, when the driver's hand moves upward from the left intermediate portion 44L2 of the rim 44 and approaches the left upper portion 44L1 of the rim 44 at time T3, the capacitance of the second left capacitive sensor 57 decreases below the reference value while the capacitance of the first left capacitive sensor 56 remains at the reference value or more.

When the capacitance of the first and second left capacitive sensors 56 and 57 change as described above from time T1 to time T3, the controller 15 estimates that the position of the driver's hand changes in the order of the left lower portion 44L3, the left intermediate portion 44L2, and the left upper portion 44L1 of the rim 44 from time T1 to time T3. In this manner, the controller 15 estimates the time series change in the position of the driver's hand based on the change in the capacitance of the first and second left capacitive sensors 56 and 57.

Further, upon estimating that the position of the driver's hand changes in the above order from time T1 to time T3, the controller 15 determines that the moving mode of the driver's hand approaching the rim 44 (hereinafter simply referred to as "the driver's hand") is the mode along the circumferential direction of the rim 44. In this way, the controller 15 estimates the moving mode of the driver's hand based on the time series change in the estimated position of the driver's hand.

Further, upon estimating that the position of the driver's hand changes in the above order from time T1 to time T3, the controller 15 estimates that the moving direction of the driver's hand is the clockwise direction. In this way, the controller 15 estimates the moving direction of the driver's hand based on the time series change in the estimated position of the driver's hand.

Further, upon estimating that the position of the driver's hand changes in the above order from time T1 to time T3, the controller 15 estimates the moving speed of the driver's hand by dividing the moving distance (the circumferential distance from the left lower portion 44L3 to the left upper portion 44L1 of the rim 44) of the driver's hand by the moving time (the period from time T1 to time T3) of the driver's hand. In this way, the controller 15 estimates the moving speed of the driver's hand based on the time series change in the estimated position of the driver's hand.

Although detailed explanation is omitted, when the driver makes a gesture in the counterclockwise direction along the circumferential direction of the left portion 44L of the rim 44, the controller 15 estimates, according to the same action as described above, that the moving mode of the driver's hand is the mode along the circumferential direction of the rim 44, and that the moving direction of the driver's hand is the counterclockwise direction.

In a case where the capacitance of the first and second left capacitive sensors 56 and 57 and the capacitance of the first and second right capacitive sensors 53 and 54 change alternately, the controller 15 invalidates the estimation result of the moving mode of the driver's hand. Accordingly, when the capacitance of the first and second left capacitive sensors 56 and 57 and the capacitance of the first and second right capacitive sensors 53 and 54 change alternately, the controller 15 does not estimate that the moving mode of the driver's hand is the mode along the circumferential direction of the rim 44.

Further, in a case where the moving time (the period from time T1 to time T3) of the driver's hand exceeds a prescribed time, the controller 15 invalidates the estimation result of the moving mode of the driver's hand. That is, when the moving time of the driver's hand exceeds the prescribed time, the controller 15 does not estimate that the moving mode of the driver's hand is the mode along the circumferential direction of the rim 44.

<The Steering Assist Control>

Figure 3:
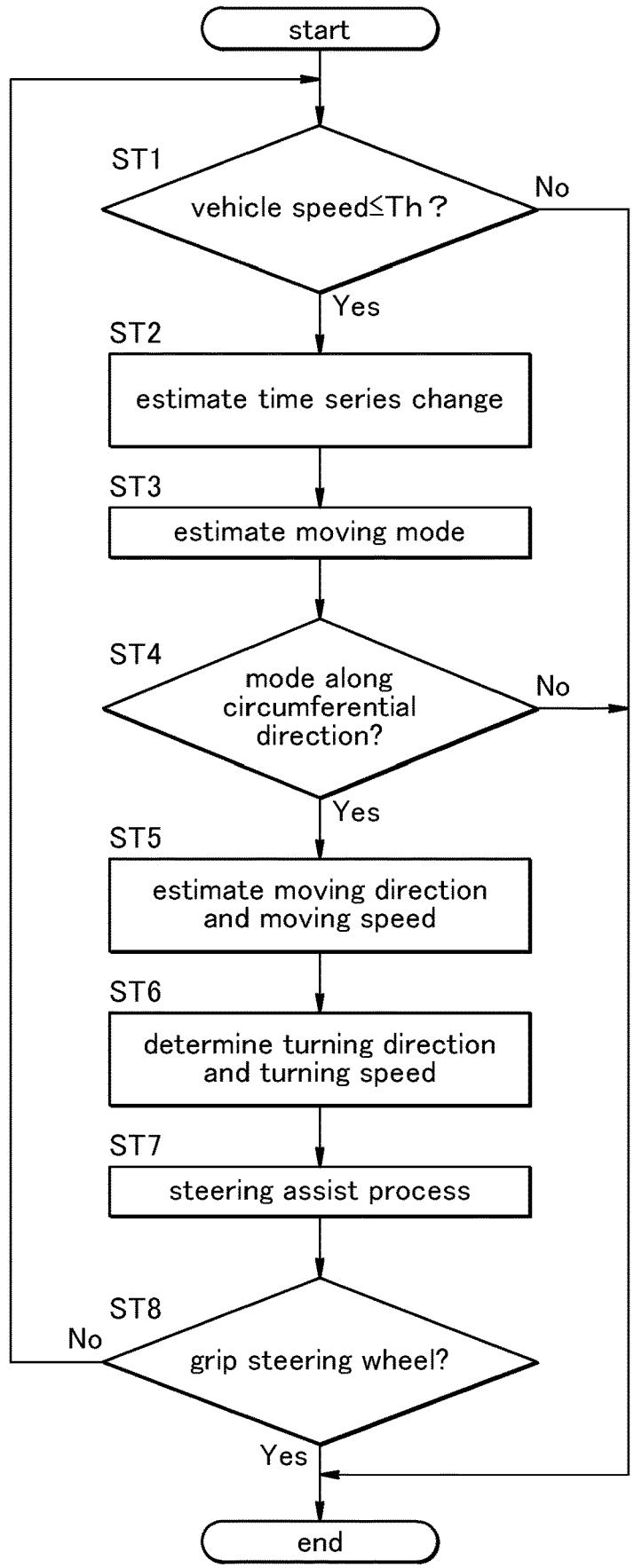
FIG. 3 is a flowchart showing steering assist control according to the embodiment of the present invention.

Next, with reference to FIG. 3, steering assist control for assisting the steering operation by the driver will be described. For example, the steering assist control may be executed when the vehicle 1 is being parked at a target parking position.

When the steering assist control is started, the controller 15 determines whether the vehicle speed of the vehicle 1 is equal to or lower than a prescribed threshold value Th based on the detection result of the vehicle speed sensor 30 (step ST1). That is, the controller 15 determines whether the vehicle 1 is in a low speed state (including a stopped state). In the present embodiment, the threshold value Th is set to 15 km/h. In another embodiment, the threshold value Th may be set to a speed lower than 15 km/h (for example, 1 km/h to 5 km/h) or higher than 15 km/h. Further, in another embodiment, the threshold value Th may be set to 0. In this case, the controller 15 determines whether the vehicle 1 is in the stopped state.

In a case where the vehicle speed of the vehicle 1 exceeds the threshold value Th (step ST1: No), the controller 15 ends the steering assist control without executing a steering assist process which will be described later.

In a case where the vehicle speed of vehicle 1 is equal to or lower than the threshold value Th (step ST1: Yes), the controller 15 estimates the time series change in the position of the driver's hand within a prescribed time (step ST2) based on the change in the capacitance of the capacitive sensors 53, 54, 56, and 57.

Next, the controller 15 estimates the moving mode of the driver's hand within the prescribed time (step ST3) based on the time series change in the position of the driver's hand estimated in step ST2.

Next, the controller 15 determines whether the moving mode of the driver's hand estimated in step ST3 is the mode along the circumferential direction of the rim 44 (step ST4).

Upon determining that the moving mode of the driver's hand is not the mode along the circumferential direction of the rim 44 (step ST4: No), the controller 15 ends the steering assist control without executing the steering assist process which will be described later.

Upon determining that the moving mode of the driver's hand is the mode along the circumferential direction of the rim 44 (step ST4: Yes), the controller 15 estimates the moving direction and moving speed of the driver's hand within the prescribed time (step ST5) based on the time series change in the position of the driver's hand estimated in step ST2.

Next, the controller 15 determines the turning direction and turning speed of the wheels 17 (step ST6) based on the moving direction and moving speed of the driver's hand estimated in step ST5. For example, upon determining that the moving direction of the driver's hand is the clockwise direction, the controller 15 may determine the turning direction of the wheels 17 as "rightward" so as to turn the vehicle 1 to the right. In contrast, upon determining that the moving direction of the driver's hand is the counterclockwise direction, the controller 15 may determine the turning direction of the wheels 17 as "leftward" so as to turn the vehicle 1 to the left. Further, the controller 15 may increase the turning speed of the wheels 17 within a range that does not exceed a prescribed upper limit as the moving speed of the driver's hand increases.

Next, the controller 15 executes the steering assist process (step ST7). In the steering assist process, the controller 15 causes the steering device 7 to automatically turn the wheels 17 according to the turning direction and turning speed of the wheels 17 determined in step ST6.

Next, the controller 15 determines whether the driver grips the steering wheel 22 (step ST8) based on the capacitance of the capacitive sensors 53, 54, 56, and 57.

Upon determining that the driver grips the steering wheel 22 (step ST8: Yes), the controller 15 ends the steering assist control. Upon determining that the driver does not grip the steering wheel 22 (step ST8: No), the controller 15 returns to step ST1 and again determines whether the vehicle speed of the vehicle 1 is equal to or lower than the threshold value Th.

<The Effect>

As described above, in a case where the vehicle speed of the vehicle 1 is equal to or lower than the threshold value Th and the estimated moving mode of the driver's hand is the mode along the circumferential direction of the rim 44, the controller 15 causes the steering device 7 to automatically turn the wheels 17. Accordingly, when the vehicle speed is low (for example, when the vehicle 1 is stopped), the driver can turn the vehicle 1 by moving his/her hand along the circumferential direction of the rim 44 without grasping and rotating the steering wheel 22. In other words, when the vehicle speed is low, the driver can turn the vehicle 1 by making a gesture along the circumferential direction of the rim 44 without directly performing the steering operation (for example, "static steering operation") on the steering wheel 22. Accordingly, a complicated steering operation including an operation to change the grip of the steering wheel 22 is not necessary, so that the burden of the steering operation at low vehicle speeds can be reduced.

In automatic parking control, the entire process to park the vehicle 1 at the target parking position may be performed automatically. However, in this case, the driver's intention cannot be reflected in the turning movement of the vehicle 1. In contrast, in the present embodiment, the turning movement of the vehicle 1 is performed in response to the driver's gesture, so that the driver's intention can be reflected in the turning movement of the vehicle 1.

Further, onboard devices may be controlled in response to the driver's contact operation on a plurality of input areas provided on the rim 44 of the steering wheel 22. However, in this case, the driver's contact operation on the plurality of input areas is required, which makes the driver's operation on the steering wheel 22 complicated. In contrast, in the present embodiment, the turning movement of the vehicle 1 is performed in response to the driver's gesture. Accordingly, the driver's contact operation on the steering wheel 22 is not necessary, so that the driver's operation on the steering wheel 22 can be simplified.

The Modified Embodiment

In the present embodiment, in a case where the vehicle speed of the vehicle 1 is equal to or lower than the threshold value Th and the estimated moving mode of the driver's hand is the mode along the circumferential direction of the rim 44, the controller 15 causes the steering device 7 to automatically turn the wheels 17. In another embodiment, in a case where the vehicle speed of the vehicle 1 is equal to or lower than the threshold value Th, the estimated moving mode of the driver's hand is the mode along the circumferential direction of the rim 44, and the current turning angle of the wheels 17 is equal to or smaller than a prescribed reference angle, the controller 15 may cause the steering device 7 to automatically turn the wheels 17.

In the present embodiment, the controller 15 determines the turning direction and turning speed of the wheels 17 based on the estimated moving direction and moving speed of the driver's hand. In another embodiment, the controller 15 may determine the turning amount (an angle at which the steering device 7 turns the wheels 17) of the wheels 17 based on the estimated moving distance of the driver's hand. For example, the controller 15 may increase the turning amount of the wheels 17 as the estimated moving distance of the driver's hand increases.

In the present embodiment, the capacitive sensors 53, 54, 56, and 57 are arranged in the hub 43 and the plurality of spokes 45 to 47. In another embodiment, the capacitive sensors 53, 54, 56, and 57 may be arranged only in the hub 43 or only in the plurality of spokes 45 to 47.

In the above embodiment, the approach sensor 35 includes two capacitive sensors 53 and 54 and two capacitive sensors 56 and 57 on the right portion and the left portion of the steering wheel 22, respectively. In another embodiment, the approach sensor 35 may include one capacitive sensor or three or more capacitive sensors on the right portion and the left portion of the steering wheel 22, respectively. For example, the third extending portion 63 of the first right capacitive sensor 53 and the first left capacitive sensor 56 in the above embodiment may be separated from the first extending portion 61 and the second extending portion 62 thereof. Accordingly, the approach sensor 35 may include three capacitive sensors on the right portion and the left portion of the steering wheel 22, respectively.

In the above embodiment, the approach sensor 35 includes the capacitive sensors 53, 54, 56, and 57 in the hub 43, the right spoke 45, and the left spoke 46 of the steering wheel 22. In another embodiment, the approach sensor 35 may include a capacitive sensor in the rim 44 of the steering wheel 22.

Concrete embodiments of the present invention have been described in the foregoing, but the present invention should not be limited by the foregoing embodiments and various modifications and alterations are possible within the scope of the present invention.

The invention claimed is:

1. A driving control device, comprising:
   a steering wheel configured to receive a steering operation of a vehicle by a driver;
   an approach sensor provided in the steering wheel and configured such that a detection value of the approach sensor changes as a driver's hand approaches the steering wheel;
   a steering device configured to turn wheels according to the steering operation of the vehicle by the driver; and
   a controller configured to control the steering device, wherein the controller is configured to
   estimate a change in a position of the driver's hand that has approached the steering wheel based on a change in the detection value of the approach sensor,
   estimate a moving mode of the driver's hand that has approached the steering wheel based on the estimated change in the position of the driver's hand, and cause the steering device to turn the wheels in a case where a vehicle speed of the vehicle is equal to or lower than a prescribed threshold value and the estimated moving mode of the driver's hand is a mode along a circumferential direction of the steering wheel.

2. The driving control device according to claim 1, wherein the approach sensor includes a plurality of capacitive sensors configured such that capacitance thereof changes as the driver's hand approaches the steering wheel, and the controller is configured to estimate a time series change in the position of the driver's hand that has approached the steering wheel based on a change in the capacitance of the plurality of capacitive sensors, and estimate a moving direction and moving speed of the driver's hand based on the estimated time series change in the position of the driver's hand.

3. The driving control device according to claim 2, wherein the controller is configured to determine a turning direction and turning speed of the wheels based on the estimated moving direction and moving speed of the driver's hand.

4. The driving control device according to claim 1, wherein the steering wheel includes an annular rim, and the approach sensor includes a capacitive sensor configured such that capacitance thereof starts to change as the driver's hand approaches the rim in a state where the driver's hand is not in contact with the rim.

5. The driving control device according to claim 4, wherein the controller is configured to cause the steering device to turn the wheels in a case where the vehicle speed of the vehicle is equal to or lower than the threshold value and the estimated moving mode of the driver's hand is a mode along a circumferential direction of the rim.

6. The driving control device according to claim 1, wherein the steering wheel includes:

a hub provided on a rotation axis of the steering wheel;

an annular rim provided outside the hub with respect to a radial direction of the steering wheel; and a plurality of spokes extending in the radial direction of the steering wheel to connect the hub and the rim, and the approach sensor is composed of a plurality of capacitive sensors arranged in the hub and/or the plurality of spokes.

7. The driving control device according to claim 6, wherein the plurality of spokes includes:

a right spoke extending rightward from the hub; and a left spoke extending leftward from the hub, the plurality of capacitive sensors includes:

a first right capacitive sensor arranged in the right spoke;

a second right capacitive sensor arranged below the first right capacitive sensor and extending in the right spoke and the hub;

a first left capacitive sensor arranged in the left spoke; and a second left capacitive sensor arranged below the first left capacitive sensor and extending in the left spoke and the hub.

8. The driving control device according to claim 1, wherein the approach sensor includes:

a right sensor arranged in a right portion of the steering wheel; and a left sensor arranged in a left portion of the steering wheel, and the controller is configured to invalidate an estimation result of the moving mode of the driver's hand in a case where a detection value of the right sensor and a detection value of the left sensor change alternately.

* * * * *